United States Patent
Dong et al.

(10) Patent No.: US 7,164,634 B2
(45) Date of Patent: Jan. 16, 2007

(54) STORAGE DEVICE WITH SHOCKPROOF FUNCTION AND ACCESSING METHOD THEREOF

(75) Inventors: Chih-Chien Dong, Taipei Hsien (TW); Chien-Fa Wang, Taipei Hsien (TW)

(73) Assignee: VIA Technologies, Inc., Taipei Hsien (TW)

(*) Notice: Subject to any disclaimer, the term of this patent is extended or adjusted under 35 U.S.C. 154(b) by 642 days.

(21) Appl. No.: 10/249,341

(22) Filed: Apr. 2, 2003

(65) Prior Publication Data

US 2004/0105368 A1    Jun. 3, 2004

(30) Foreign Application Priority Data

Dec. 3, 2002   (TW) .............................. 91135003 A

(51) Int. Cl.
     *G11B 7/00*    (2006.01)

(52) U.S. Cl. .............................. 369/47.33; 369/53.12; 369/53.21

(58) Field of Classification Search ............. 369/47.33, 369/47.34, 47.14, 44.28, 44.27, 47.36, 47.42, 369/53.12, 53.21
See application file for complete search history.

(56) References Cited

U.S. PATENT DOCUMENTS 6,597,532 B1 *  7/2003  Usui et al. ................ 360/97.03
6,839,309 B1 *  1/2005  Yunoki et al. ........... 369/47.33

\* cited by examiner

*Primary Examiner*—Nabil Hindi
(74) *Attorney, Agent, or Firm*—Jianq Chyun IP Office

(57) ABSTRACT

A storage unit with shockproof function and accessing method thereof is provided. The storage unit includes a storage media, a speed sensing device or a vibration sensing device and a control unit. The storage unit is capable of operating in an environment with strong vibration and avoiding most read/write errors at a reduced production cost.

12 Claims, 5 Drawing Sheets

STORAGE DEVICE WITH SHOCKPROOF FUNCTION AND ACCESSING METHOD THEREOF

CROSS REFERENCE TO RELATED APPLICATIONS

This application claims the priority benefit of Taiwan application serial no. 91135003, filed Dec. 3, 2002.

BACKGROUND OF INVENTION

1. Field of Invention

The present invention relates to a storage device. More particularly, the present invention relates to a storage device with shockproof function and accessing method thereof.

2. Description of Related Art

As electronic technology continues to advance, the volume of information exchanged is increasing every day. As a result, storage devices for holding data also develop at a tremendous pace to suit various operating environments. Researchers of communication products are often required to improve a device to fit a particular operating environment.

For example, a response to the request for reading data from a compact disc player is executed only after a read command is received. However, this process of reading is suitably operated in a stable environment such as at home or in an office if the device is used in an environment subjected to intense vibration, the reading system may fail to read the data correctly. In some cases, the compact disc player may even be damaged.

Nevertheless, some storage systems including the compact disc player have to function in an environment with intense vibratory environment such as inside a car, bus or a coach. To work under such unstable condition, operating mechanism inside the storage system is often modified. Although such modification is able to prevent any damage to compact disc player, there is limited improvement on data accessing errors. Furthermore, the cost of producing such shock-resistant devices is usually high.

SUMMARY OF INVENTION

Accordingly, one object of the present invention is to provide a storage device with shockproof function and accessing method thereof that can be implemented on a storage media when combined with a speed sensing device or a vibration sensing device and a control device for controlling data access.

To achieve these and other advantages and in accordance with the purpose of the invention, as embodied and broadly described herein, the invention provides a storage unit. The storage unit has a shockproof function designed for working inside a mobile unit with intense vibration such as a car, a bus or a coach. The storage unit includes a storage media, a speed sensing device and a control device. The storage media is, for example, a compact disc or hard disc for holding data. The speed sensing device detects the moving speed of the mobile unit and outputs a speed value. The control device is coupled to the storage media and the speed sensing device such that stored data is permitted to access only if the speed value falls below a preset threshold value.

In the embodiment of this invention, the storage device may further include a buffer memory for holding a portion of the storage media data. When the control device disallowed the reading of data from the storage media, data can be read out from the buffer memory. Similarly, when the control device disallowed the writing of data to the storage media, data can be temporarily written to the buffer memory.

The buffer memory can be a ring buffer to facilitate sequential access of memory data. Alternatively, the buffer memory can be a cache buffer to facilitate random access of memory data.

When the control device receives a sequential access command, if the speed value of detected by the mobile unit is higher than a preset speed value, the ring buffer is checked to determine whether the quantity of data inside the buffer is at a safety level or a threshold level. If the quantity of data inside the buffer is at the safety level, the pick-up head of the storage media is parked and the rotating motor of the storage media is stopped. On the other hand, if the quantity of data inside the buffer is at the threshold level, the rotating motor of the storage media is switched on in advance to speed up the accessing speed.

When data is read out from the storage media, the safety level is set at greater than 75% of the ring buffer data capacity while the threshold level is set at below 50% of the ring buffer data capacity. In a similar way, when data is written to the storage media, the safety level is set at below 25% of the ring buffer data capacity while the threshold level is set at greater than 50% of the ring buffer data capacity.

When the control device receives a random access command and that the speed value detected by the mobile unit is greater than the preset speed value, the rotating motor of the storage media is switched on in advance to speed up the accessing speed.

This invention provides a method of accessing a storage unit with a shockproof function designed for working inside a mobile unit with intense vibration such as a car, a bus or a coach. The storage unit has a storage media and the method includes the following steps. First, an access command is received and then moving speed of the mobile unit is detected. A speed value representing the moving speed is output. When the speed value is lower than a preset speed limit, access to the data within the storage media is granted. However, when the speed value is higher than the preset speed value, access to the data within the storage media is disallowed and the requesting unit must wait.

In the embodiment of this invention, the storage device may further include a buffer memory for holding a portion of the storage media data. When reading of data from the storage media is disallowed, data can be read out from the buffer memory. Similarly, when writing of data to the storage media is disallowed, data can be temporarily written to the buffer memory.

The buffer memory can be a ring buffer to facilitate sequential access of memory data. Alternatively, the buffer memory can be a cache buffer to facilitate random access of memory data.

When the control device receives a sequential access command, if the vibration value of detected by the mobile unit is higher than a preset vibration value, the ring buffer is checked to determine whether the quantity of data inside the buffer is at a safety level or a threshold level. If the quantity of data inside the buffer is at the safety level, the pick-up head of the storage media is parked and the rotating motor of the storage media is stopped. On the other hand, if the quantity of data inside the buffer is at the threshold level, the rotating motor of the storage media is switched on in advance to speed up the accessing speed.

When data is read out from the storage media, the safety level is set at greater than 75% of the ring buffer data capacity while the threshold level is set at below 50% of the ring buffer data capacity. In a similar way, when data is written to the storage media, the safety level is set at below 25% of the ring buffer data capacity while the threshold level is set at greater than 50% of the ring buffer data capacity.

When the control device receives a random access command and that the speed value detected by the mobile unit is greater than the preset speed value, the rotating motor of the storage media is switched on in advance to speed up the accessing speed.

This invention provides an alternative method of accessing a storage unit with a shockproof function designed for working inside a mobile unit with intense vibration such as a car, a bus or a coach. The storage unit has a storage media and the method includes the following steps. First, an access command is received and then vibration strength of the mobile unit is detected. A vibration value representing the vibration strength is output. When the vibration value is lower than a preset vibration limit, access to the data within the storage media is granted. However, when the vibration value is higher than the preset speed value, access to the data within the storage media is disallowed and the requesting unit must wait.

In the embodiment of this invention, the storage device may further include a buffer memory for holding a portion of the storage media data. When reading of data from the storage media is disallowed, data can be read out from the buffer memory. Similarly, when writing of data to the storage media is disallowed, data can be temporarily written to the buffer memory.

When the control device receives a sequential access command, if the vibration value of detected by the mobile unit is higher than a preset vibration value and that the quantity of data inside the buffer is at the safety level, the pick-up head of the storage media is parked and the rotating motor of the storage media is stopped. On the other hand, if the detected vibration value is higher than the present value but the quantity of data inside the buffer is at the threshold level, the rotating motor of the storage media is switched on in advance to speed up the accessing speed.

When data is read out from the storage media, the safety level is set at greater than 75% of the ring buffer data capacity while the threshold level is set at below 50% of the ring buffer data capacity. In a similar way, when data is written to the storage media, the safety level is set at below 25% of the ring buffer data capacity while the threshold level is set at greater than 50% of the ring buffer data capacity.

When the control device receives a random access command and that the vibration value detected by the mobile unit is greater than the preset vibration value, the rotating motor of the storage media is switched on in advance to speed up the accessing speed.

In brief, the storage unit according to this invention includes a conventional storage media, a speed sensing device or a vibration sensing device and a control device so that the storage unit working an environment with intense vibration is capable of reducing access errors and production cost.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
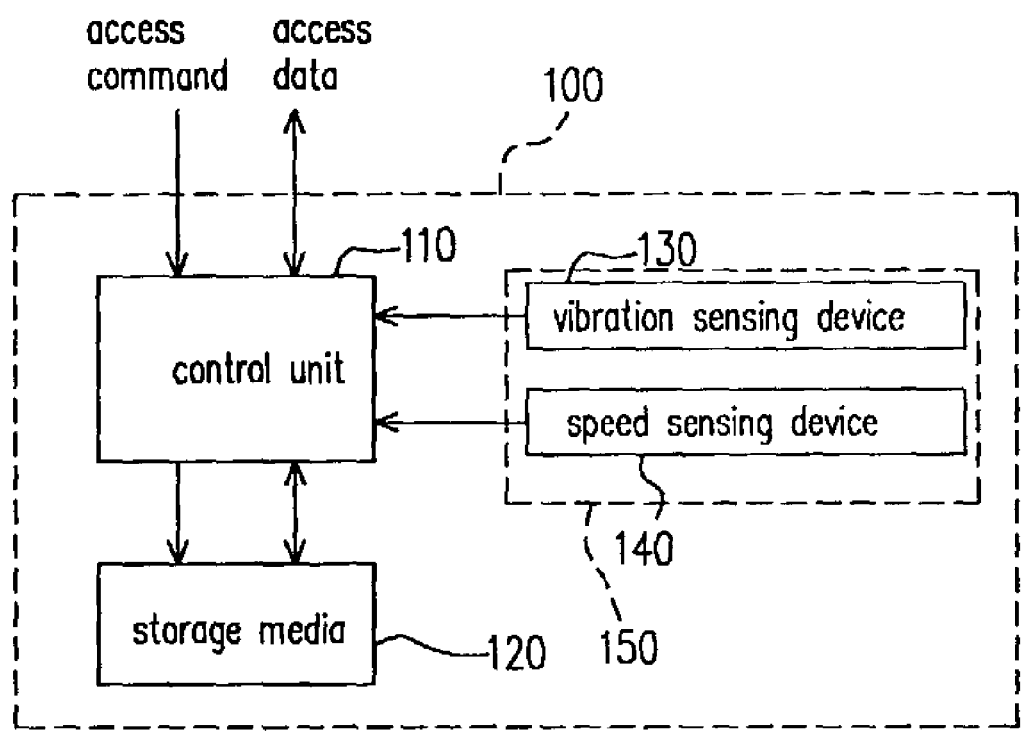
FIG. 1 is a block diagram of a storage unit with shockproof function according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a block diagram of a storage unit with shockproof function according to one preferred embodiment of this invention. As shown in FIG. 1, the storage unit 100 includes a control device 110, a storage media 120 and a sensing device 150 such as a vibration sensing device 130 and/or a speed sensing device 140.

The storage media is device for holding data such as an optical disc or a hard disc. The vibration sensing device 130 detects the vibrating strength parameters such as the vibrating frequency or vibrating magnitude of a mobile unit such as a car, a bus or a coach and outputs a vibration value representing the vibration strength. The speed sensing device 140 detects the moving speed of the mobile unit and outputs a speed value representing the moving speed. The control device 110 is coupled to the media 120, the vibration sensing device 130 and the speed sensing device 140 for granting permission to access data within the storage media 120.

The storage unit 100 is able to operate in two different modes. When the mobile unit travels in an urban area, the storage unit 100 may be set to an urban mode. In the urban mode, the speed value output from the speed sensing device 140 is utilized to determine if access to the data inside the storage media 120 is granted. In other words, when the speed value is lower than a preset speed value, indicating that the mobile unit is stuck before a set of traffic lights or within a congested area and hence moves slowly, data within the storage media 120 can be safely accessed.

On the other hand, when the mobile unit travels in a suburban or country area, the storage unit 100 may be set to the suburban mode. In the suburban mode, the vibration sensing device 130 is utilized to determine if access to the data inside the storage media 120 is granted. In other words, when the vibration value is lower than a preset vibration threshold value, indicating the mobile unit is traveling on a flat road, data within the storage media 120 can be safely accessed.

In addition, to improve accessing efficiency of the storage unit 100 and reduce the waiting for an access command, the storage unit 100 may further include a buffer memory (not shown) for holding a portion of the data from the storage media 120. Thus, data can be read from the buffer memory when the control device 110 disallows the reading of data from the storage unit 120 and data can be written to the buffer memory when the control device 110 disallows the writing of data to the storage unit 120. In sequential data access operation, the buffer memory can be configured into a ring buffer. On the contrary, in a random data access operation, the buffer memory can be configured into a cache buffer. FIGS. 2 to 5 are flow charts showing the steps for accessing data inside a storage unit sequentially and randomly.

Figure 2:
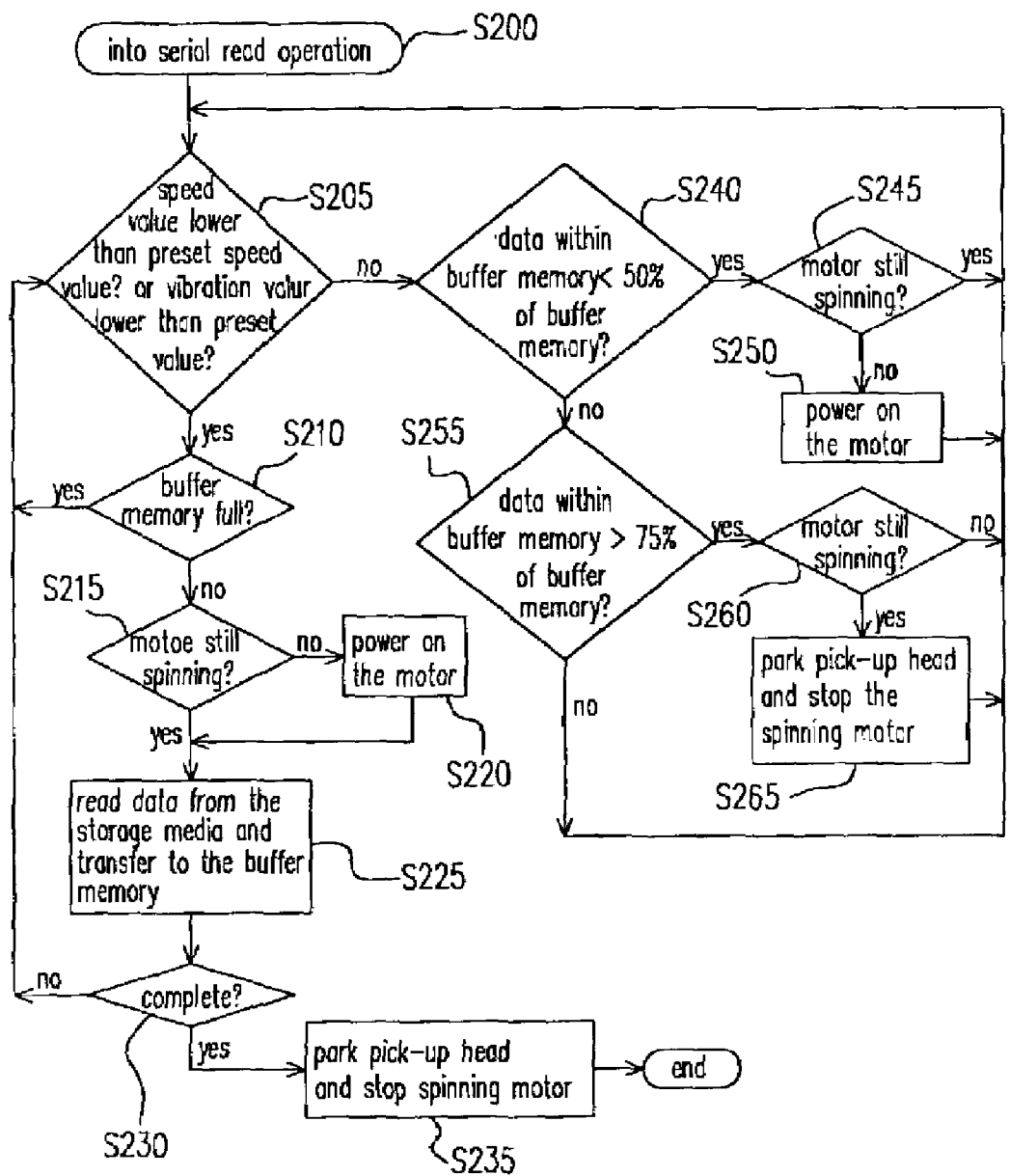
FIG. 2 is a flow chart showing the steps for sequentially reading data from the storage unit according to this invention.

FIG. 2 is a flow chart showing the steps for sequentially reading data from the storage unit according to this invention. Once the storage unit 100 is set to read data sequentially (S200), speed value or vibration value is determined according to the operation mode of the storage unit 100 (S205). If the storage unit 100 is set to the urban mode and that the speed value is lower than the preset speed value or the storage unit 100 is set to the suburban mode and that the vibration value is lower than the preset vibration value, reading from the storage unit 100 is granted. Thereafter, the buffer memory is checked to determine if its is full (S210). If the buffer memory is full, there is no need to read data from the storage media 120 for the time being. Otherwise, the driving motor of the storage unit 100 is checked to determine if it is still spinning (S215). If the driving motor is not spinning, the motor is switched on (S220) and then data is read from the storage unit 120 and transferred to the buffer memory (S225). Next, the storage unit 100 is checked to determine if all the requested data is read out (S230). If some data remains to be read, continue to check if data access is still granted (S205). Otherwise, since reading is complete, the pick-up head of the storage unit 100 is parked and then the spinning motor is stopped (S235).

On the contrary, if accessing the storage unit 100 is disallowed due to the speed value or the vibration value (S205), the buffer memory is checked to determine if its occupancy is smaller than a threshold level of 50% of the buffer storage capacity (S240) or larger than a safety level of 75% of the buffer storage capacity (S255). On reaching the threshold level, the driving motor is checked to determine if its is still spinning (S245). If the driving motor is not spinning, the motor is turned on (S250) to speed up the reading. On reaching the safety level, the driving motor is also checked to determine if its is still spinning (S260). If the driving motor is spinning, the pick-up is parked and the spinning motor is stopped (S265). Thereafter, continue to assess if data access is granted (S205) so that all requested data are read from the storage unit 100.

Figure 3:
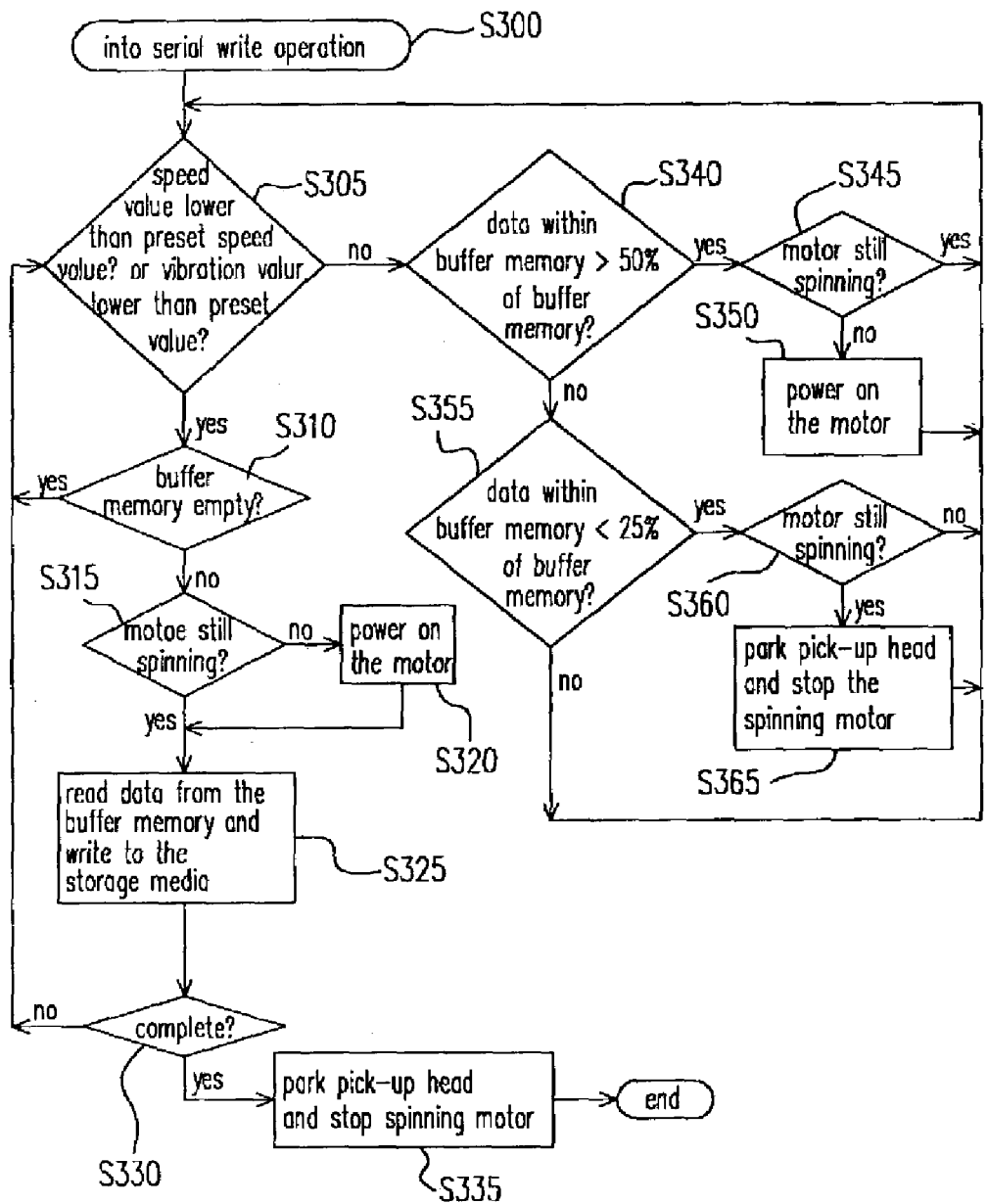
FIG. 3 is a flow chart showing the steps for sequentially writing data into the storage unit according to this invention.

FIG. 3 is a flow chart showing the steps for sequentially writing data into the storage unit according to this invention. Once the storage unit 100 is set to write data sequentially (S300), speed value or vibration value is determined according to the operation mode of the storage unit 100 (S305). If the storage unit 100 is set to the urban mode and that the speed value is lower than the preset speed value or the storage unit 100 is set to the suburban mode and that the vibration value is lower than the preset vibration value, writing to the storage unit 100 is granted. Thereafter, the buffer memory is checked to determine if its is empty (S310). If the buffer memory is empty, there is no need to write data into the storage media 120 for the time being. Otherwise, the driving motor of the storage unit 100 is checked to determine if it is still spinning (S315). If the driving motor is not spinning, the motor is switched on (S320) and then data is read from the buffer memory and written to the storage unit 120 (S325). Next, the buffer memory is checked to determine if all the requested data is written to the storage unit 100 (S330). If some data remains to be written, continue to check if data access is still granted (S305). Otherwise, since writing is complete, the pick-up head of the storage unit 100 is parked and then the spinning motor is stopped (S335).

On the contrary, if accessing the storage unit 100 is disallowed due to the speed value or the vibration value (S305), the buffer memory is checked to determine if its occupancy is greater than a threshold level of 50% of the buffer storage capacity (S340) or smaller than a safety level of 25% of the buffer storage capacity (S355). On reaching the threshold level, the driving motor is checked to determine if its is still spinning (S345). If the driving motor is not spinning, the motor is switched on (S350) to speed up the writing. On reaching the safety level, the driving motor is also checked to determine if its is still spinning (S360). If the driving motor is spinning, the pick-up is parked and the spinning motor is stopped (S365). Thereafter, continue to assess if access is granted (S305) so that all requested data are written to the storage unit 100.

Figure 4:
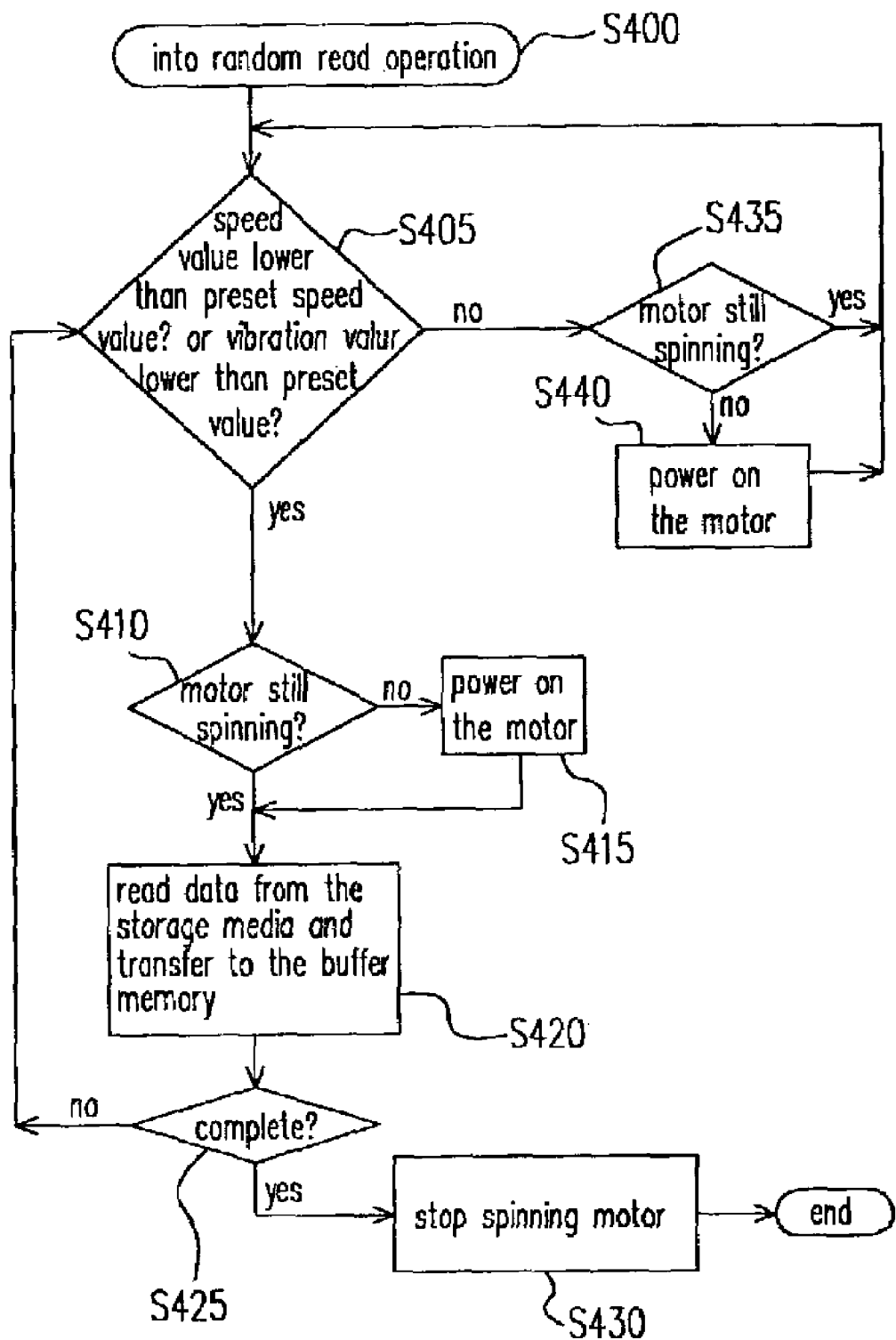
FIG. 4 is a flow chart showing the steps for randomly reading data from the storage unit according to this invention.

FIG. 4 is a flow chart showing the steps for randomly reading data from the storage unit according to this invention. Once the storage unit 100 is set to read data randomly (S400), speed value or vibration value is determined according to the operation mode of the storage unit 100 (S405). If the storage unit 100 is set to the urban mode and that the speed value is lower than the preset speed value or the storage unit 100 is set to the suburban mode and that the vibration value is lower than the preset vibration value, reading from the storage unit 100 is granted. Thereafter, the driving motor of the storage unit 100 is checked to determine if it is spinning (S410). If the driving motor is not spinning, the motor is turned on (S415) and then data is read from the storage unit 120 and transferred to the buffer memory (S420). Next, the storage unit 100 is checked to determine if all the requested data is read out (S425). If some data remains to be read, continue to check if data access is still granted (S405). Otherwise, the spinning motor is stopped (S430).

On the contrary, if accessing the storage unit 100 is disallowed due to the speed value or the vibration value (S405), the driving motor is checked to determine if its is still spinning (S435). If the driving motor is not spinning, the motor is switched on (S440) to speed up the reading.

Figure 5:
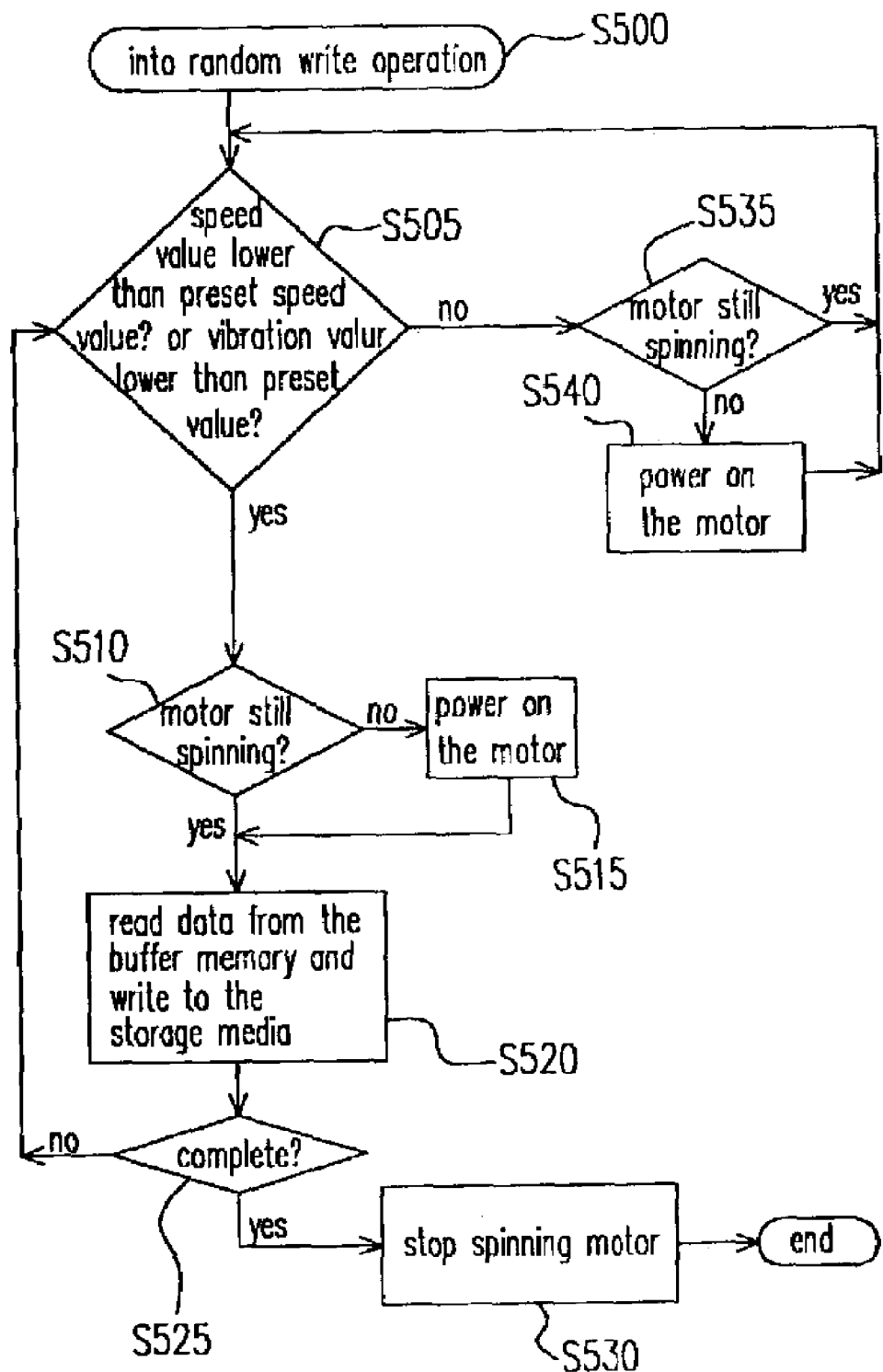
FIG. 5 is a flow chart showing the steps for randomly writing data into the storage unit according to this invention.

FIG. 5 is a flow chart showing the steps for randomly writing data into the storage unit according to this invention. Once the storage unit 100 is set to write data randomly (S500), speed value or vibration value is determined according to the operation mode of the storage unit 100 (S505). If the storage unit 100 is set to the urban mode and that the speed value is lower than the preset speed value or the storage unit 100 is set to the suburban mode and that the vibration value is lower than the preset vibration value, writing to the storage unit 100 is granted. Thereafter, the driving motor of the storage unit 100 is checked to determine if it is still spinning (S510). If the driving motor is not spinning, the motor is turned on (S515) and then data is read from the buffer memory and written to the storage unit 120 (S520). Next, the buffer memory is checked to determine if all the requested data is written to the storage unit 100 (S525). If some data remains to be written, continue to check if data access is still granted (S505). Otherwise, the spinning motor is stopped (S530).

On the contrary, if accessing the storage unit 100 is disallowed due to the speed value or the vibration value (S505), the driving motor is checked to determine if its is still spinning (S535). If the driving motor is not spinning, the motor is switched on (S540) to speed up the writing.

In summary, major advantages of this invention includes:

1. Common hard drive or optical disc drive can be used in an environment with frequent or intense vibration such as inside a car.

2. Hard drives and optical disc drives may operate normally and pick up head damage due to vibration can be prevented.

3. Through the use of buffer memory in this invention, accessing capacity of the storage unit is enhanced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A storage unit with shockproof function inside a mobile device, comprising:
   a storage media;
   a sensing device for detecting a motion signal of the mobile device; and
   a control unit coupled to the storage media and the sensing device for granting access to the storage media, wherein the storage unit further includes a buffer memory in the form of a ring buffer for holding a portion of the data so that data can be read from the buffer memory when the control unit disallows the reading of data from the storage unit and data can be written to the buffer when the control unit disallows the writing of data to the storage unit, and the pick-up head of the storage unit is parked and the rotation of a spinning motor is stopped when the motion signal is higher than a preset value and that the data stored inside the ring buffer is at a safety level, and
   wherein data is read from the storage media only when the safety level of the ring buffer is greater than 75% of buffer capacity and data is written to the storage media only when the safety level of the ring buffer is smaller than 25% of the buffer capacity.

2. The storage unit of claim 1, wherein the sensing device is a speed sensing device.

3. The storage unit of claim 2, wherein the motion signal is generated from a linear velocity of the mobile device.

4. The storage unit of claim 1, wherein the sensing device is a vibration sensing device.

5. The storage unit of claim 4, wherein the motion signal is generated from a vibration amplitude of the mobile device.

6. The storage unit of claim 1, wherein the spinning motor of the storage media is powered up in advance when the motion signal is higher than the preset value and that the data stored inside the ring buffer reaches a threshold level.

7. The storage unit of claim 1, wherein the storage media is an optical drive.

8. The storage unit of claim 1, wherein the storage media is a hard drive.

9. A method of accessing a shockproof storage unit inside a mobile device, wherein the storage unit includes a storage media, the method comprising the steps of:
   receiving an access command;
   detecting a motion signal of the mobile device; and
   granting access to the storage media based on the motion signal, wherein a pick-up head of the storage unit is parked and rotation of a spinning motor is stopped when the access command is a serial access command, the motion signal is higher than a preset value and that the data within the buffer memory is at a safety level, and the storage unit further includes a buffer memory for holding a portion of the data so that data can be read from the buffer memory when the reading of data from the storage unit being disallowed and data can be written to the buffer when the writing of data to the storage unit being disallowed, and
   wherein data is read from the storage media only when the safety level of the ring buffer is greater than 75% of buffer capacity and data is written to the storage media only when the safety level of the buffer memory is smaller than 25% of the buffer capacity.

10. The method of claim 9, wherein a parametric value represents a speed value for the forward advancing speed of the mobile device.

11. The method of claim 9, wherein a parametric value represents a vibration value for the magnitude of vibration of the mobile device.

12. The method of claim 9, wherein the spinning motor of the storage media is powered up in advance when the access command is a random access and that the motion signal is higher than a preset value.

* * * * *